United States Patent
Kobayashi

(10) Patent No.: US 9,990,085 B2
(45) Date of Patent: Jun. 5, 2018

(54) TOUCH PANEL AND METHOD FOR MANUFACTURING THE SAME

(71) Applicant: FUJIFILM Corporation, Tokyo (JP)

(72) Inventor: Hiroyuki Kobayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 15/337,416

(22) Filed: Oct. 28, 2016

(65) Prior Publication Data

US 2017/0052639 A1    Feb. 23, 2017

Related U.S. Application Data

(63) Continuation of application No. PCT/JP2015/059596, filed on Mar. 27, 2015.

(30) Foreign Application Priority Data

Jun. 30, 2014    (JP) .................................. 2014-135270

(51) Int. Cl.
    *G06F 3/041*    (2006.01)
    *G06F 3/044*    (2006.01)

(52) U.S. Cl.
    CPC ............ *G06F 3/0416* (2013.01); *G06F 3/041* (2013.01); *G06F 3/044* (2013.01); *G06F 2203/04103* (2013.01); *G06F 2203/04112* (2013.01)

(58) Field of Classification Search
    CPC ......... G06F 3/0416; G06F 3/041; G06F 3/044
    USPC ................................................. 345/173, 174
    See application file for complete search history.

(56) References Cited

U.S. PATENT DOCUMENTS

| 2009/0219257 A1 | 9/2009 | Frey et al. |
| 2011/0079501 A1 | 4/2011 | Arai |
| 2013/0050103 A1 | 2/2013 | Song et al. |

FOREIGN PATENT DOCUMENTS

| JP | 2009-54833 A | 3/2009 |
| JP | 2010-182137 A | 8/2010 |
| JP | 2011-81538 A | 4/2011 |
| JP | 2011-513846 A | 4/2011 |
| JP | 2013-45439 A | 3/2013 |

(Continued)

OTHER PUBLICATIONS

Translation of International Preliminary Report on Patentability (Chapter II), available on PatentScope Nov. 24, 2016, issued in International Application No. PCT/JP2015/059596, 4 pages in English.

(Continued)

*Primary Examiner* — Calvin C Ma
(74) *Attorney, Agent, or Firm* — Sughrue Mion, PLLC

(57) ABSTRACT

A touch panel 10 includes a first electrode-side terminal portion 42A that is electrically connected to an upper detection electrode 36A. The first electrode-side terminal portion 42A includes a first resin layer 44a which is provided on a first substrate 34A and in which a first terminal groove 54a is formed and a first conductive material 48a which fills the first terminal groove 54a. A flexible print substrate 28 which is a circuit board is stacked on the first electrode-side terminal portion 42A through an anisotropic conductive film 60 including a conductive ball 61. A film including the conductive ball 61, of which the average diameter x has a predetermined relationship with the dimensions a of the first terminal groove 54a in a width direction and the depth c of a space 64 formed in the first terminal groove 54a, is selected as the anisotropic conductive film 60.

8 Claims, 15 Drawing Sheets

(56) References Cited

FOREIGN PATENT DOCUMENTS

| | | |
|---|---|---|
| JP | 2013-61658 A | 4/2013 |
| JP | 2013-127658 A | 6/2013 |

OTHER PUBLICATIONS

International Search Report of PCT/JP2015/059596, dated Jun. 16, 2015. [PCT/ISA/210].

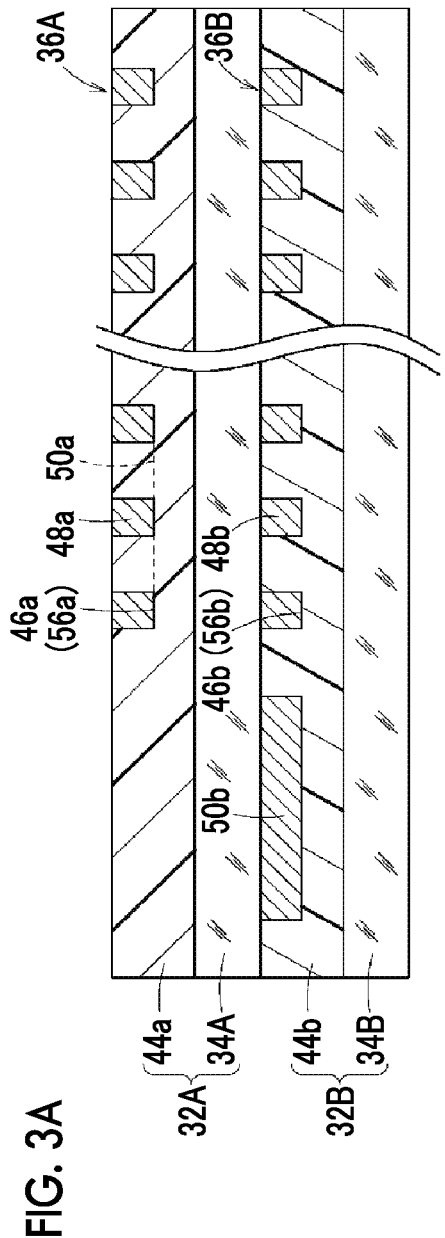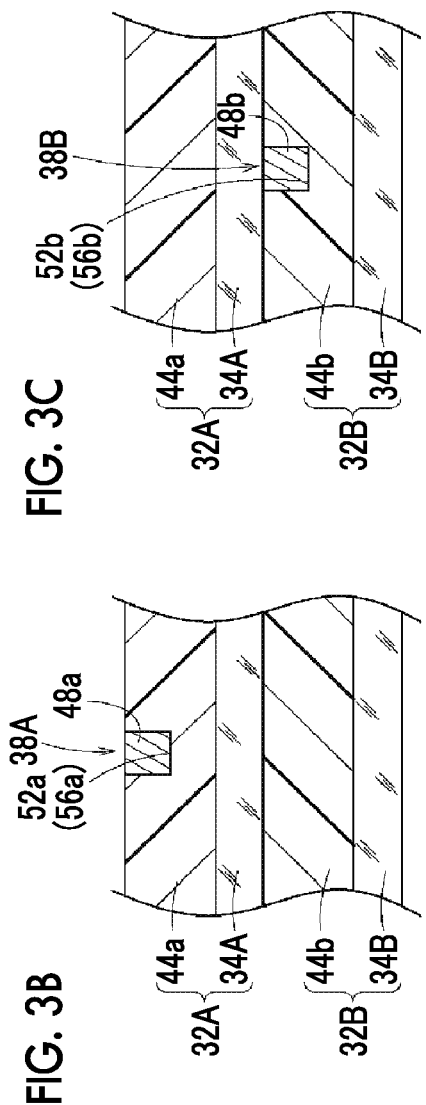

TOUCH PANEL AND METHOD FOR MANUFACTURING THE SAME

CROSS-REFERENCE TO RELATED APPLICATIONS

This application is a Continuation of PCT International Application No. PCT/JP2015/059596 filed on Mar. 27, 2015, which claims priority under 35 U.S.C § 119 (a) to Japanese Patent Application No. 2014-135270 filed on Jun. 30, 2014. Each of the above application(s) is hereby expressly incorporated by reference, in its entirety, into the present application.

BACKGROUND OF THE INVENTION

1. Field of the Invention

The present invention relates to a touch panel in which a resin material including conductive balls for electrically connecting electrode-side terminal portions and circuit-side terminal portions is interposed between a substrate on which detection electrodes and the electrode-side terminal portions are formed and a circuit board on which the circuit-side terminal portions are formed and a method for manufacturing the touch panel.

2. Description of the Related Art

A so-called touch panel that enables a user to perform various operations using a finger is widely used as a display device of, for example, a multi-function mobile phone (smart phone) or a digital camera. In a general touch panel, fine metal conductor wires are provided on at least one surface of a substrate, which is a resin film, to form detection electrodes. In recent years, a technique has been proposed in which a groove formed in a substrate, which is a resin film, is filled with a conductive material to form a detection electrode (for example, see paragraphs <0076> to <0078> and FIGS. 5 and 11 in JP2011-513846A).

A detection electrode is electrically connected to an electrode-side terminal portion through a peripheral wire. The electrode-side terminal portion is electrically connected to a circuit-side terminal portion of a flexible print substrate (circuit board) provided on a substrate. At that time, an anisotropic conductive film which is made of a thermosetting resin including conductive balls is interposed between the substrate and the flexible print substrate, as disclosed in JP2013-61658A and JP2013-45439A. The electrode-side terminal portion and the circuit-side terminal portion are electrically connected to each other by the conductive ball. That is, the conductive ball becomes a conductive path from the electrode-side terminal portion to the circuit-side terminal portion.

SUMMARY OF THE INVENTION

As disclosed in JP2011-513846A, in a case in which a groove is filled with a conductive material to form a detection electrode, it is considered that a peripheral wire or an electrode-side terminal portion is preferably formed by filling a groove with the conductive material. In this case, the grooves can be formed by one operation or can be filled with the conductive material by one operation. Therefore, the number of processes for manufacturing a touch panel is reduced and the operation is simplified.

It is considered that, after an excessive amount of conductive material is applied onto one surface of the substrate in which the grooves are formed, the conductive material remaining on the one surface of the substrate is removed, in order to fill the grooves with the conductive material. However, the inventors found that, when this operation was performed, the conductive material in the groove was slightly lower than the opening of the groove, that is, a space was formed between the upper surface of the conductive material in the groove and the opening of the groove.

When this situation occurs, it is difficult for the conductive material in the groove to physically come into contact with the conductive ball in the anisotropic conductive film. Therefore, the electrode-side terminal portion is not reliably electrically connected to the circuit-side terminal portion. As a result, the manufacturing yield of the touch panel is significantly reduced.

The invention has been made in view of the above-mentioned problems and an object of the invention is to provide a touch panel in which electrical connection between an electrode-side terminal portion of a substrate and a circuit-side terminal portion of a circuit board is sufficiently ensured and which can be manufactured with high yield and a method for manufacturing the touch panel.

The object of the invention is achieved by the following [1] and [2].

[1] There is provided a touch panel comprising: a substrate; a plurality of detection electrodes that are provided on the substrate; peripheral wires that are electrically connected to the detection electrodes; electrode-side terminal portions that are electrically connected to the peripheral wires; a circuit board on which circuit-side terminal portions electrically connected to the electrode-side terminal portions are provided; and a resin material that is interposed between the substrate and the circuit board and includes a conductive ball electrically connecting the electrode-side terminal portions and the circuit-side terminal portions. The electrode-side terminal portion includes a resin layer in which a groove for a terminal portion is formed and a conductive material which fills the groove for a terminal portion. When an average diameter of the conductive ball is x, the dimensions of the groove for a terminal portion in a width direction are a, and a distance from an upper surface of the conductive material filling the groove for a terminal portion to an opening of the groove for a terminal portion is c, the resin material includes a conductive ball satisfying x≤a and x>c or a conductive ball satisfying x>a and 1<x/a≤7.

[2] There is provided a method for manufacturing a touch panel comprising a substrate, a plurality of detection electrodes that are provided on the substrate, peripheral wires that are electrically connected to the detection electrodes, electrode-side terminal portions that are electrically connected to the peripheral wires, a circuit board on which circuit-side terminal portions electrically connected to the electrode-side terminal portions are provided, and a resin material that is interposed between the substrate and the circuit board and includes a conductive ball electrically connecting the electrode-side terminal portions and the circuit-side terminal portions. The method includes: a step of forming a resin layer on at least a portion of one surface of the substrate and transferring a convex portion of a mold to the resin layer to form a groove for a terminal portion; a step of filling at least a portion of the groove for a terminal portion with a conductive material to form the electrode-side terminal portion; a step of removing the conductive material which remains on an outer surface of the resin layer; and a step of stacking the circuit board, on which the circuit-side terminal portions electrically connected to the electrode-side terminal portions are provided, on the resin layer through a resin material including a conductive ball. When an average diameter of the conductive ball is x, the dimensions of the groove for a terminal portion in a width direction are a, and a distance from an upper surface of the conductive material filling the groove for a terminal portion to an opening of the groove for a terminal portion is c, a material which includes a conductive ball satisfying x≤a and x>c or a conductive ball satisfying x>a and 1<x/a≤7 is selected as the resin material.

In the specification, the "average diameter" means a value obtained by randomly sampling ten conductive balls, observing and calculating the two-dimensional diameters of the conductive balls in a plan view, using, for example, a microscope, and averaging the two-dimensional diameters.

The "dimensions of the groove in the width direction" indicate the dimensions of the groove in a direction perpendicular to the direction in which the groove extends and are particularly the dimensions of the opening of the groove. The "dimensions of the groove in the width direction" is also referred to as the "width of the groove" according to circumstances. The "upper surface" indicates a surface of the conductive material filling the groove which can be seen in a plan view. The "distance from the upper surface to the opening of the groove" is the distance from the surface to the opening of the groove, that is, the depth of a space which is not filled with the conductive material. When the upper surface of the conductive material is curved, the average value of the distances from the upper surface to the opening of the groove is used. The depth of the space can be measured by, for example, a scanning electron microscope (SEM).

That is, in the invention, a material including conductive balls, of which the average diameter x has a predetermined relationship with the dimensions a of the groove for a terminal portion in the width direction and the distance c from the upper surface of the conductive material filling the groove for a terminal portion to the opening of the groove for a terminal portion, is used as the resin material (generally referred to as an anisotropic conductive film (ACF)) interposed between the substrate and the circuit board. Specifically, the resin material includes a conductive ball satisfying x≤a and x>c or a conductive ball satisfying x>a and 1<x/a≤7.

In a case in which the average diameter x of the conductive ball is equal to or less than a (x≤a), it is preferable that the average diameter x is equal to or greater than two times the distance from the opening of the groove to the upper surface of the conductive material, that is, the depth c of the space (x≥2c). In this case, in the conductive ball which comes into contact with the upper surface, the length of a portion that protrudes from the opening of the groove increases. Therefore, it is possible to increase the probability of the conductive ball coming into contact with the circuit-side terminal portion. As a result, electrical connection is ensured in the terminal grooves required for practical use.

In a case in which the average diameter x of the conductive ball is greater than a (x>a), it is preferable that x/a is greater than 1 and equal to or less than 6, that is, 1<x/a≤6 is satisfied. In this case, the conductive ball enters the groove while pressing the groove. Therefore, the probability of the conductive ball coming into contact with the upper surface of the conductive material increases. As a result, electrical connection is ensured in the terminal grooves required for practical use.

In a case in which the groove is filled with the conductive material to form the terminal portion, a space is inevitably formed between the opening of the groove and the upper surface of the conductive material. However, when the resin material including the conductive ball which satisfy the above-mentioned relationship is used, the conductive ball is easily accommodated in the space and can physically come into contact with the conductive material in the groove. In addition, the conductive ball physically comes into contact with another conductive ball outside the groove. Therefore, a conductive path is formed between the conductive material in the groove and the terminal portion of the circuit board through the conductive ball.

That is, it is possible to manufacture a touch panel with high yield.

The conductive ball which is located in the vicinity of the opening of the groove for a terminal portion may be deformed. In this case, preferably, an average area of the deformed conductive ball in a plan view is equal to or greater than 1.2 times an average area of the conductive ball, which is not deformed in the resin material, in a plan view. A sufficient conductive path is formed by the conductive ball which is relatively greatly deformed.

In the above-mentioned structure, preferably, a plurality of grooves for a terminal portion are connected to form a mesh shape. In this structure, it is possible to effectively increase the number of grooves forming the terminal portion. Therefore, the frequency of contact, that is, the contact area between the conductive material of the terminal portion and the conductive ball increases. As a result, it is possible to reduce the contact resistance between the conductive material and the conductive ball and thus to easily ensure a conductive path.

A groove for a peripheral wire which is connected to the groove for a terminal portion and a groove for a detection electrode which is connected to the groove for a peripheral wire may be formed in the resin layer. In this case, the peripheral wire and the detection electrode are made of a conductive material that fills the groove for a peripheral wire and a conductive material that fills the groove for a detection electrode, respectively.

In this case, the detection electrode, the peripheral wire, and the terminal portion can be formed at the same time by the same process. Therefore, the number of processes for obtaining a touch panel is reduced and an operation is simplified. In this case, it is preferable that all of the conductive materials are the same material.

In the invention, a material including a conductive ball, of which the average diameter x has a predetermined relationship with the dimensions a of the groove for a terminal portion in the width direction and the distance c from the upper surface of the conductive material filling the groove for a terminal portion to the opening of the groove for a terminal portion, is used as the resin material interposed between the substrate and the circuit board. Therefore, at least a portion of the conductive ball is accommodated in the space formed between the groove for a terminal portion and the upper surface of the conductive material filling the groove for a terminal portion.

According to this structure, the conductive ball which is located in the vicinity of the opening of the groove for a terminal portion physically comes into contact with the conductive material in the groove. The conductive ball comes into direct contact with the terminal portion of the circuit board. According to circumstances, the conductive ball physically comes into contact with another conductive ball outside the groove. Therefore, a conductive path is reliably formed between the conductive material in the groove and the terminal portion of the circuit board through conductive ball.

For the above-mentioned reasons, it is possible to obtain a touch panel with high yield.

BRIEF DESCRIPTION OF THE DRAWINGS

FIGS. 3A to 3C are cross-sectional views taken along the lines IIIA-IIIA, IIIB-IIIB, and IIIC-IIIC of FIG. 2, respectively.

DESCRIPTION OF THE PREFERRED EMBODIMENTS

Hereinafter, preferred embodiments of a touch panel and a method for manufacturing the touch panel according to the invention will be described in detail with reference to the accompanying drawings. In the specification, the numerical range represented by "to" means a range which includes values before and after "to" as a lower limit and an upper limit, respectively. In addition, an "upper" side means a side (outer surface side) close to a viewer who sees a touch panel and a "lower side" means a side (inner surface side) that is far away from the viewer.

Figure 1:
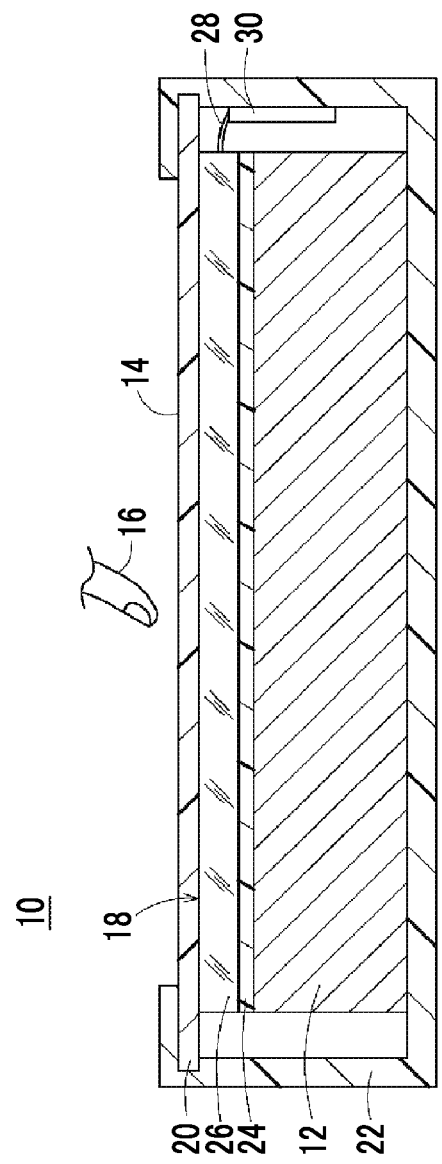
FIG. 1 is a longitudinal sectional view schematically illustrating a touch panel according to an embodiment of the invention.

FIG. 1 is a longitudinal sectional view schematically illustrating a touch panel 10 according to this embodiment. The touch panel 10 is a capacitive touch panel and comprises a display device 12 that displays arbitrary visible information, a touch sensor 18 that detects the position of an indicator 16, such as a finger which touches or approaches a touch surface 14 of the touch panel 10, a cover member 20 that covers the touch sensor 18, and a housing 22.

The display device 12 is not particularly limited and preferred examples of the display device 12 include a liquid crystal display, a plasma display, an organic electro-luminescence (EL) display, an inorganic EL display, and an electronic paper.

The touch sensor 18 includes a sensor body 26 that is bonded to one surface of the display device 12 through an adhesive layer 24 and a control circuit unit (for example, an IC circuit) 30 that is electrically connected to the sensor body 26 through a flexible print substrate 28 as a circuit board. The detailed structure of the sensor body 26 will be described below.

When the indicator 16 touches or approaches the touch surface 14, the control circuit unit 30 checks a change in capacitance between the indicator 16 and the sensor body 26 and detects a contact position or an approach position. In the example illustrated in FIG. 1, the control circuit unit 30 is fixed to the inner surface of the housing 22. However, the control circuit unit 30 may be fixed to an arbitrary position of the housing 22.

The cover member 20 is stacked on one surface of the sensor body 26 to form the touch surface 14 of the touch panel 10. The cover member 20 may be coated with, for example, a silicon oxide and may be bonded to one surface of the sensor body 26. Alternatively, the cover member 20 may be bonded to one surface of the sensor body 26 through a transparent pressure sensitive adhesive, such as an optical clear adhesive (OCA) sheet, in order to prevent damage due to friction. The material forming the cover member 20 may be preferably, for example, glass, tempered glass, sapphire, or a resin such as polycarbonate (PC) or polymethyl methacrylate (PMMA). The housing 22 accommodates the display device 12, the touch sensor 18, and the cover member 20.

As illustrated in FIGS. 2 to 5, the sensor body 26 is formed by stacking a first conductive film 32A and a second conductive film 32B. The first conductive film 32A and the second conductive film 32B are stacked through a transparent pressure sensitive adhesive, such as an OCA sheet, which is not illustrated.

The first conductive film 32A includes a first substrate 34A, a plurality of upper detection electrodes 36A that are provided on the first substrate 34A, a plurality of first peripheral wires 40A that are electrically connected to the upper detection electrodes 36A through first wire connection portions 38A, and a plurality of first electrode-side terminal portions 42A that are electrically connected to the first peripheral wires 40A. The invention is not particularly limited to the stacked structure. For example, electrodes may be provided on both surfaces of one substrate or substrates, each of which has electrodes provided on both surfaces, may be bonded to each other by, for example, an OCA. Alternatively, two electrodes may be stacked on one surface of a substrate, with an insulating film interposed therebetween, or a driving electrode and a scanning electrode may be provided on one surface of a substrate so as not to intersect each other in a plan view.

The first substrate 34A is an insulating and transparent substrate. The transmittance of visible light with a wavelength of 400 nm to 700 nm through the first substrate 34A can be arbitrarily set. However, the transmittance is preferably equal to or greater than 80% and more preferably equal to or greater than 90%. It is preferable that the first substrate 34A has a thickness of 25 μm to 250 μm.

For example, glass or a resin can be preferably used as the material forming the first substrate 34A. Examples of this type of resin include: polyesters, such as polyethylene terephthalate (PET) and polyethylene naphthalate (PEN); polyolefins, such as polyethylene (PE), polypropylene (PP), polystyrene, and polyethylene vinyl acetate (EVA); vinyl-based resins; acrylic resins, such as polycarbonate (PC), polyamide, polyimide, and polymethyl methacrylate (PMMA); triacetyl cellulose (TAC); cycloolefin polymer (COP); cycloolefin copolymer (COC); and polyether sulfone (PES).

The plurality of upper detection electrodes 36A are provided in parallel so as to be separated from each other in a second direction (the Y direction and the longitudinal direction of the first substrate 34A) while extending in a first direction (the X direction and the lateral direction of the first substrate 34A). The upper detection electrode 36A includes a first resin layer 44a that is provided on the first substrate 34A and a first conductive material 48a that fills a first electrode groove 46a (a groove for a detection electrode) formed in the first resin layer 44a (see FIG. 3A).

In this embodiment, the first resin layer 44a is stacked on the entire one surface of the first substrate 34A. However, the first resin layer 44a may not be stacked on a portion of the first substrate 34A. The first resin layer 44a can be appropriately made of, for example, an insulating and transparent ultraviolet-curable resin or an insulating and transparent thermosetting resin. Examples of the material forming the first resin layer 44a include an acrylic resin, a urethane resin, an epoxy resin, and a polyester resin.

The upper detection electrode 36A has a mesh pattern obtained by arranging a plurality of first electrode grooves (grooves for a detection electrode) 46a in a mesh shape in a plan view. In other words, the mesh pattern is a combination of a plurality of cells having the same shape. The shape of a cell of the mesh may be a polygon, such as a triangle, a rectangle, a pentagon, or a hexagon. Among them, it is preferable that the shape of the cell is a rhomboid (see FIG. 2), a square, and a regular hexagon. The mesh pattern may be a combination of a plurality of cells with different shapes or may be a random pattern.

In the invention, it is preferable that the detection electrode has a mesh shape in order to manufacture wiring electrodes at the same time. However, only a wiring portion may be manufactured by the method described in the specification, using an electrode made of, for example, a metal oxide. That is, the invention includes this aspect.

The width of the first electrode groove 46a is preferably in the range of 1 μm to 10 μm. The pitch between the first electrode grooves 46a which are parallel and adjacent to each other is preferably in the range of 10 μm to 600 μm.

The first electrode groove 46a has a square shape in a cross-sectional view. The depth of the first electrode groove 46a is preferably in the range of 1 μm to 10 μm and more preferably in the range of 1 μm to 5 μm. In this case, it is possible to relatively reduce the thickness of the first resin layer 44a and to effectively prevent the cutting of the first conductive material 48a filling a first terminal groove 54a. This is also applied to the depth of a first wire connection groove 50a, a first wiring groove 52a, and the first terminal groove 54a which will be described below. The first electrode groove 46a can be set in an arbitrary shape in a cross-sectional view.

It is preferable that the first conductive material 48a includes at least one type of material selected from the group consisting of copper, silver, aluminum, nickel, chromium, and carbon black. In addition, the first conductive material 48a may be formed by mixing or stacking a plurality of types of materials.

Figure 2:
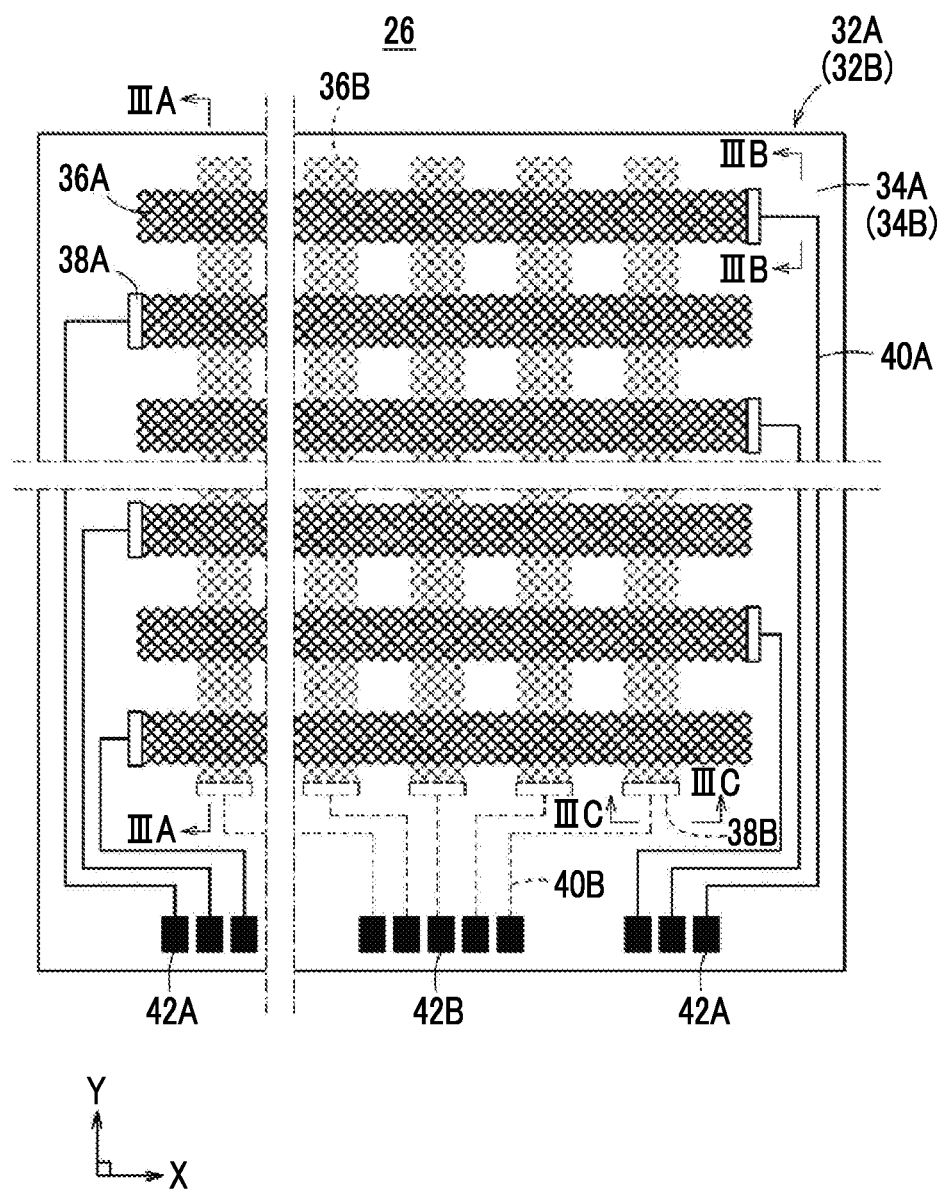
FIG. 2 is a plan view illustrating a sensor body forming the touch panel illustrated in FIG. 1.
Figure 4:
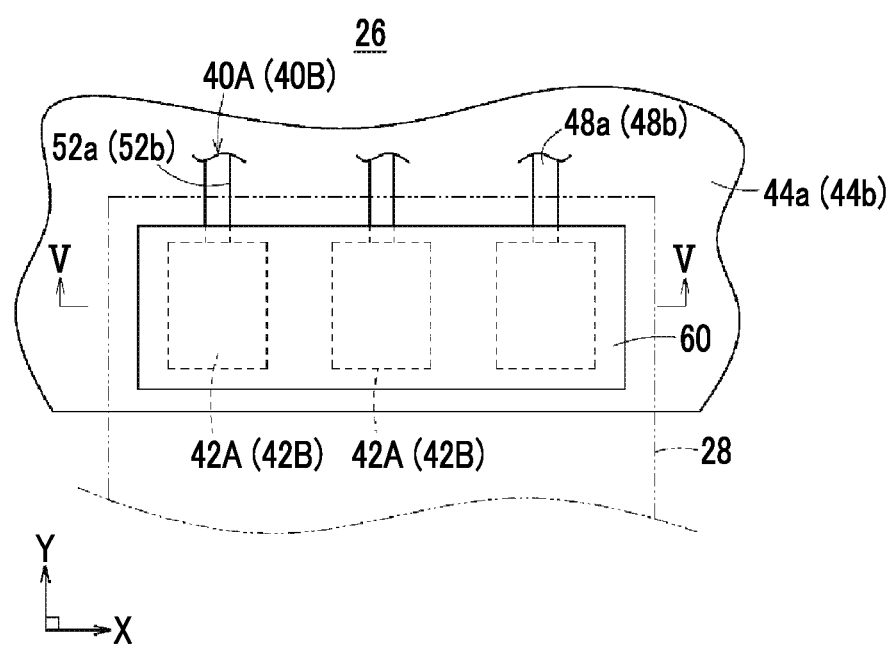
FIG. 4 is a partial plan view schematically illustrating connection between a terminal portion and a flexible circuit board.

As illustrated in FIG. 2, the first peripheral wire 40A which is a peripheral wire is electrically connected to one end of each upper detection electrode 36A through the first wire connection portion 38A. As such, when the first wire connection portion 38A is provided, a current smoothly flows from the first peripheral wire 40A to the upper detection electrode 36A and the sensitivity of the touch panel 10 is improved. In addition, the first wire connection portion 38A may not be provided and the upper detection electrode 36A and the first peripheral wire 40A which is a peripheral wire may be directly electrically connected to each other.

The structure in which the first wire connection portion 38A is provided will be described. For example, the first wire connection portion 38A may be provided at the right end of an even-numbered upper detection electrode 36A in the X direction in FIG. 2 and may be provided at the left end of an odd-numbered upper detection electrode 36A in the X direction in FIG. 2. Each first wire connection portion 38A includes the first resin layer 44a having the first wire connection groove 50a and the first conductive material 48a that fills the first wire connection groove 50a. The first wire connection groove 50a is connected to the first electrode groove 46a, has a rectangular shape in a plan view, and extends in the X direction.

The first peripheral wire 40A may extend from the first wire connection portion 38A of the even-numbered upper detection electrode 36A along the right side of the first conductive film 32A which extends in the Y direction, may be bent to the center of one side of the first conductive film 32A which extends in the X direction, and may be electrically connected to the right first electrode-side terminal portion 42A.

The first peripheral wire 40A extends from the first wire connection portion 38A of the odd-numbered upper detection electrode 36A along the left side of the first conductive film 32A which extends in the X direction, is bent to the center of one side of the first conductive film 32A which extends in the X direction, and is electrically connected to the left first electrode-side terminal portion 42A.

The first peripheral wires 40A electrically connect a plurality of upper detection electrodes 36A and the first electrode-side terminal portions 42A and each include the first resin layer 44a having the first wiring groove (a groove for a peripheral wire) 52a and the first conductive material 48a that fills the first wiring groove 52a (see FIG. 3B). The first wiring groove 52a is connected to the first wire connection groove 50a. The width of the first wiring groove 52a may be equal to the width of the first electrode groove 46a.

A plurality of first electrode-side terminal portions 42A are provided at one end of the first substrate 34A in the Y direction in a state in which they are separated from each other in the X direction (in a state in which they are electrically insulated from each other). The gap between the first electrode-side terminal portions 42A which are adjacent to each other in the X direction is preferably in the range of 10 μm to 1000 μm and more preferably in the range of 15 μm to 500 μm, in terms of electrical insulation and a reduction in size.

Figure 5:
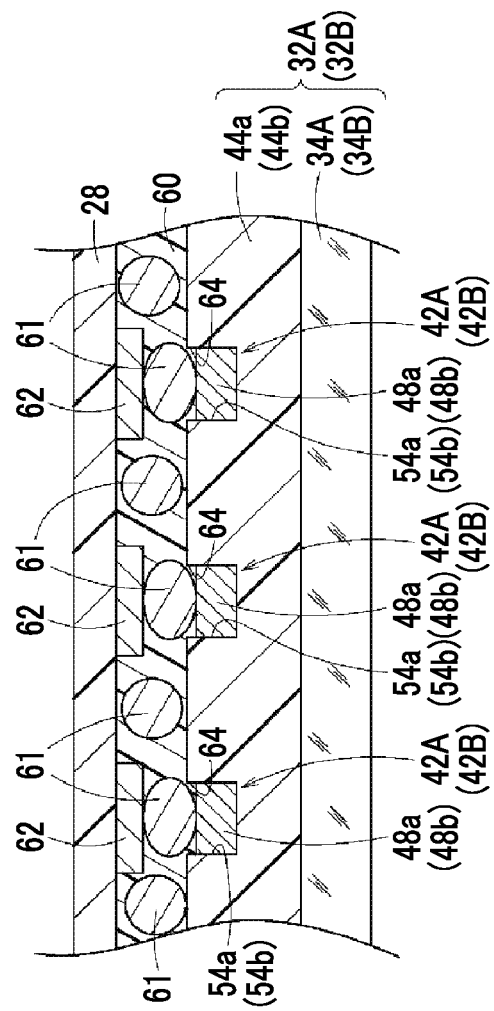
FIG. 5 is a cross-sectional view taken along the line V-V of FIG. 4.

The first electrode-side terminal portion 42A includes the first resin layer 44a having the first terminal groove (a groove for a terminal) 54a and the first conductive material 48a that fills the first terminal groove 54a (see FIG. 5). The first terminal groove 54a is connected to the first wiring groove 52a. The first electrode-side terminal portion 42A has a pattern obtained by forming the first terminal groove 54a in a rectangular shape in a plan view and extends in the Y direction.

It is preferable that the dimensions (dimensions in the X direction) of the first electrode-side terminal portion 42A in the width direction are greater than the dimensions of the first wiring groove 52a in the width direction. It is preferable that the first electrode-side terminal portion 42A is formed by the first terminal grooves which are arranged in a mesh shape.

The first terminal groove 54a is not completely filled with the first conductive material 48a. That is, the upper surface of the first conductive material 48a filling the first terminal groove 54a is closer to the bottom of the groove than the outer surface (an opening of the first terminal groove 54a) of the first resin layer 44a. This will be described below.

In the first conductive film 32A, the first electrode grooves 46a, the first wire connection grooves 50a, the first wiring grooves 52a, and the first terminal grooves 54a which correspond to each other are connected to form a plurality of series of first grooves 56a and the first grooves 56a are filled with the first conductive material 48a to form the plurality of upper detection electrodes 36A, the plurality of first wire connection portions 38A, the plurality of first peripheral wires 40A, and the plurality of first electrode-side terminal portions 42A.

The first electrode-side terminal portion 42A is electrically connected to a circuit-side terminal portion 62 of the flexible print substrate 28 through an anisotropic conductive film 60. The anisotropic conductive film 60 is formed by dispersing conductive ball 61 in an insulating thermosetting resin. That is, the anisotropic conductive film 60 is a resin material including conductive ball 61 as conductive particles. The anisotropic conductive film 60 has conductivity in a thickness direction and has an insulating property in a plane direction.

The conductive ball 61 becomes a conductive path from the first electrode-side terminal portion 42A to the circuit-side terminal portion 62. The conductive ball 61 is a conductive particle and is preferably obtained by coating the entire surface of a substantial sphere made of a resin material with a metal film such as a gold film. Since this type of conductive ball 61 and the anisotropic conductive film 60 including the conductive ball 61 are known, the detailed description thereof will not be repeated.

Here, a film including the conductive ball 61 of which the average diameter satisfies a predetermined condition is selected as the anisotropic conductive film 60.

Figure 6A:
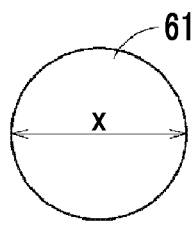
FIGS. 6A and 6B are diagrams schematically illustrating the definition of the dimensions a of a groove for a terminal in a width direction, the depth c of a space, and the average diameter x of conductive ball.
Figure 6B:
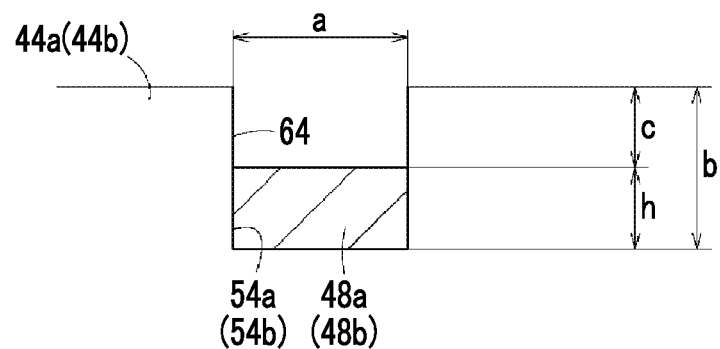

Specifically, as illustrated in FIGS. 6A and 6B, when the dimensions of the opening of the first terminal groove 54a in the width direction is a, the distance from the upper surface of the first conductive material 48a filling the first terminal groove 54a to the opening of the first terminal groove 54a (a value obtained by subtracting the filling height h of the first conductive material 48a from the depth b of the first terminal groove 54a) is c, and the average diameter of the conductive ball 61 is x, the conductive ball 61 satisfies x≤a and x>c or satisfies x>a and 1<x/a≤7. In the following description, a space from the upper surface of the first conductive material 48a filling the first terminal groove 54a to the opening of the first terminal groove 54a is also referred to as a "gap" and is denoted by reference numeral 64. The distance c from the upper surface of the first conductive material 48a to the opening of the first terminal groove 54a is equal to the depth of the space 64.

First, the former case, that is, the case in which the distance c satisfies x≤a and x>c will be described.

Figure 7A:
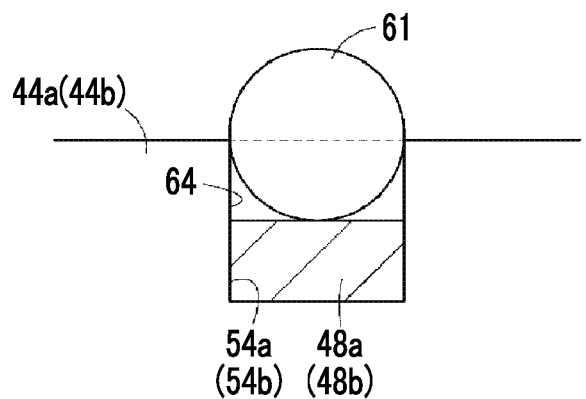
FIGS. 7A to 7C are longitudinal sectional views schematically illustrating the positions of a conductive ball in a case in which $x \geq 2c$ is satisfied, a case in which $2c > x > c$ is satisfied, and a case in which $x \leq c$ is satisfied, respectively.
Figure 7B:
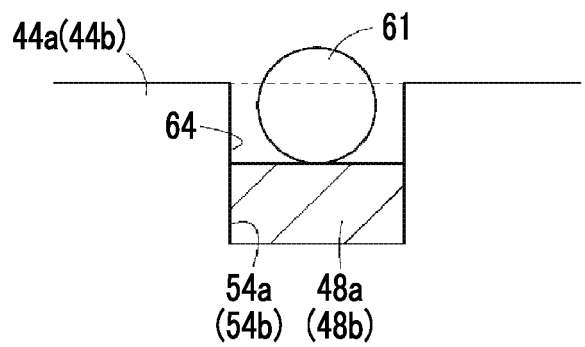
Figure 7C:
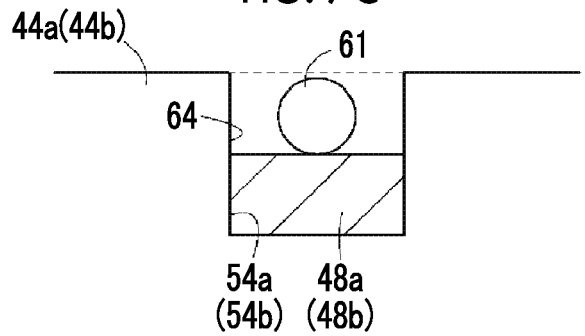

When x≤a is satisfied, that is, when the average diameter x of the conductive ball 61 is equal to or less than the dimensions a of the first terminal groove 54a in the width direction, the conductive ball 61 enters the first terminal groove 54a and comes into contact with the first conductive material 48a, as illustrated in FIGS. 7A to 7C. FIGS. 7A to 7C illustrate a case in which x≥2c is satisfied, a case in which 2c>x>c is satisfied, and a case in which x≤c is satisfied, respectively.

In the case in which x≥2c is satisfied as illustrated in FIG. 7A, half or more of the conductive ball 61 in the space 64 is exposed from the space 64. Therefore, a portion of the conductive ball 61 which is exposed from the space 64 and the circuit-side terminal portion 62 of the flexible print substrate 28 are likely to physically come into contact with each other. That is, the first conductive material 48a in the first terminal groove 54a forming the first electrode-side terminal portion 42A is reliably electrically connected to the circuit-side terminal portion 62 of the flexible print substrate 28 through the conductive ball 61.

According to circumstances, in the conductive ball 61 which enters the first terminal groove 54a, a portion which exposed from the space 64 indirectly comes into contact with the circuit-side terminal portion 62 through other conductive ball 61 which are disposed outside the space 64. That is, in this case, the first conductive material 48a in the first terminal groove 54a forming the first electrode-side terminal portion 42A is electrically connected to the circuit-side terminal portion 62 of the flexible print substrate 28 through a plurality of conductive ball 61.

In a case in which 2c>x>c is satisfied as illustrated in FIG. 7B, a portion of the conductive ball 61 is exposed from the space 64 similarly to the above. Therefore, a portion of the conductive ball 61 which is exposed from the space 64 and the circuit-side terminal portion 62 of the flexible print substrate 28 can come into contact with each other directly or indirectly through other conductive ball 61 disposed outside the space 64. Therefore, in this case, the first conductive material 48a (first electrode-side terminal portion 42A) in the first terminal groove 54a is electrically connected to the circuit-side terminal portion 62 of the flexible print substrate 28 through the conductive ball 61.

In contrast, in a case in which x≤c is satisfied as illustrated in FIG. 7C, the conductive ball 61 which enters the first terminal groove 54a is entirely accommodated in the space 64. In other words, the conductive ball 61 is not exposed from the space 64. Therefore, it is difficult for the conductive ball 61 which is entirely accommodated in the space 64 to physically come into contact with the circuit-side terminal portion 62 of the flexible print substrate 28 or other conductive ball 61 disposed outside the space 64. That is, in this case, a conductive path is less likely to be formed between the first conductive material 48a in the first terminal groove 54a and the circuit-side terminal portion 62 of the flexible print substrate 28 by the conductive ball 61.

As described above, when the conductive ball 61 enters the first terminal groove 54a since x≤a is satisfied, x>c needs to be satisfied. In this case, the conductive ball 61 in the space 64 and the circuit-side terminal portion 62 of the flexible print substrate 28 come into contact with each other directly or indirectly through the conductive ball 61 outside the space 64. Therefore, a conductive path is formed between the first conductive material 48a in the first terminal groove 54a and the circuit-side terminal portion 62 of the flexible print substrate 28 by the conductive ball 61. That is, the first electrode-side terminal portion 42A and the circuit-side terminal portion 62 are electrically connected to each other through the conductive ball 61.

Next, a case in which x>a and 1<x/a≤7 are satisfied will be described.

Figure 8A:
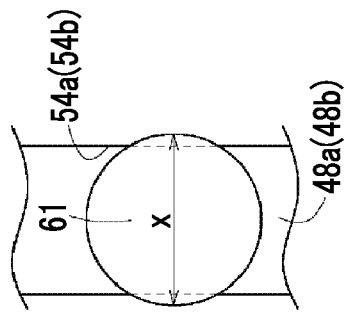
FIGS. 8A and 8B are a longitudinal sectional view and a plan view illustrating a state in which a conductive ball satisfying $x > a$ is caught in the opening of the groove for a terminal, respectively.
Figure 8B:
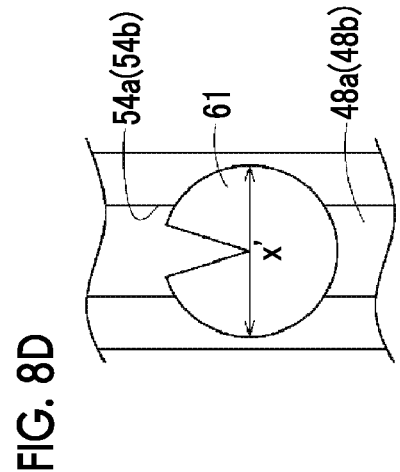

When x>a is satisfied, that is, when the average diameter x of the conductive ball 61 is greater than the dimensions a of the first terminal groove 54a in the width direction, it is difficult for the conductive ball 61 to enter the first terminal groove 54a. Therefore, before the anisotropic conductive film 60 is thermally pressed, the conductive ball 61 is caught in the opening of the first terminal groove 54a and does not enter the first terminal groove 54a, as illustrated in FIGS. 8A and 8B.

Figure 8C:
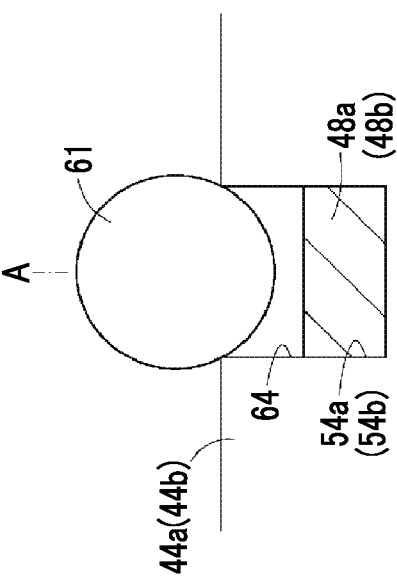
FIGS. 8C and 8D are a longitudinal sectional view and a plan view illustrating a state in which the conductive ball is deformed and a portion of the conductive ball enters the groove for a terminal, respectively.
Figure 8D:
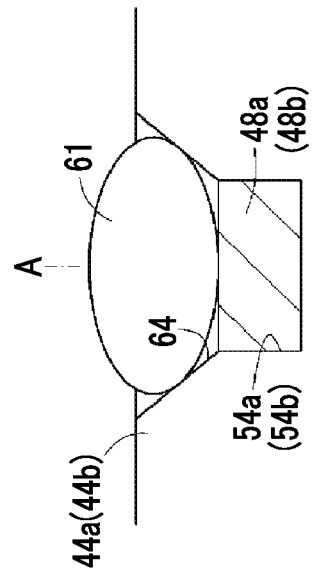

Here, the anisotropic conductive film 60 is stacked on the first conductive film 32A and is thermally pressed. At that time, the conductive ball 61 caught in the opening of the first terminal groove 54a is pressed and deformed (that is, the apparent diameter of the conductive ball 61 increases). In particular, when 1<x/a≤7 is satisfied, the opening of the first terminal groove 54a is widened by the conductive ball 61 with a circle-equivalent diameter x' corresponding to a diameter which is calculated in an A direction (see FIGS. 8A and 8C) in a plan view, as illustrated in FIGS. 8C and 8D. Therefore, the conductive ball 61 enters the first terminal groove 54a and comes into contact with the first conductive material 48a. In this way, the first conductive material 48a (first electrode-side terminal portion 42A) in the first terminal groove 54a is reliably electrically connected to the circuit-side terminal portion 62 of the flexible print substrate 28 through the conductive ball 61.

Figure 9A:
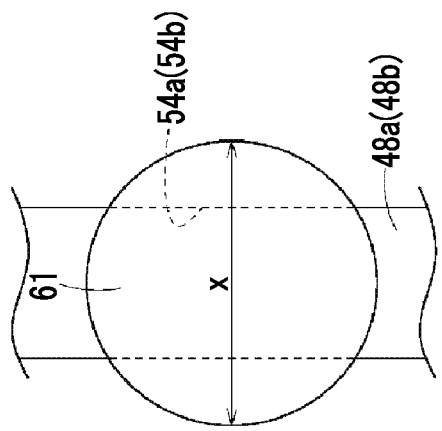
FIGS. 9A and 9B are a longitudinal sectional view and a plan view illustrating a state in which a conductive ball with a larger diameter than that in FIG. 8A is caught in the opening of the groove for a terminal, respectively.
Figure 9B:
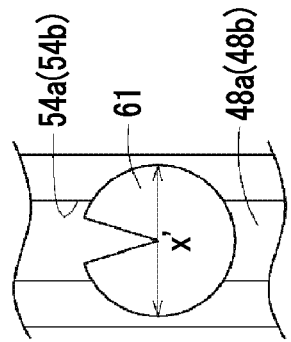
Figure 9C:
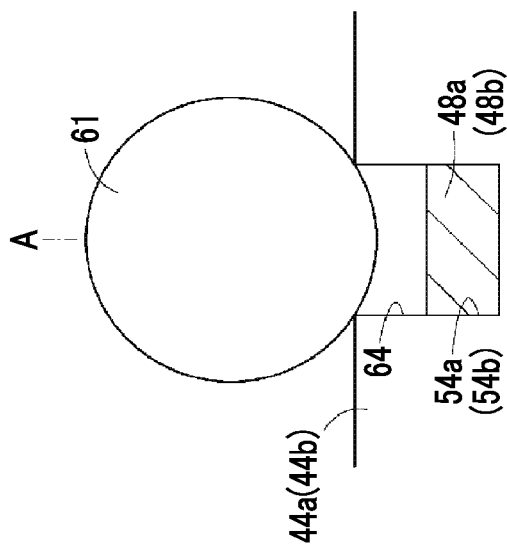
FIGS. 9C and 9D are a longitudinal sectional view and a plan view illustrating a state in which the conductive ball is deformed and a portion of the conductive ball enters the groove for a terminal, respectively.
Figure 9D:
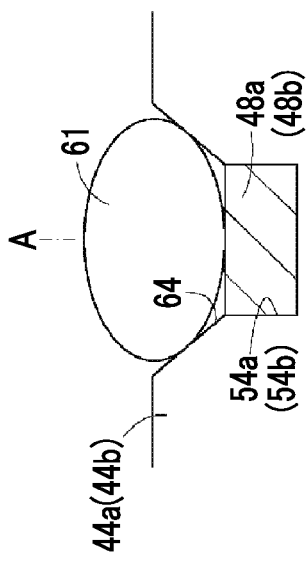

FIGS. 9A and 9B are a longitudinal sectional view and a plan view illustrating the conductive ball 61 before the conductive ball 61 is deformed when the anisotropic conductive film 60 including the conductive ball 61 of which the average diameter x satisfies 1<x/a=7 is used, respectively. FIGS. 9C and 9D are a longitudinal sectional view and a plan view illustrating the conductive ball 61 after the conductive ball 61 is deformed. In this case, before the anisotropic conductive film 60 is thermally pressed, the conductive ball 61 is caught in the opening of the first terminal groove 54a, is thermally pressed such that the opening of the first terminal groove 54a is widened, enters the first terminal groove 54a, and comes into contact with the first conductive material 48a. That is, the first electrode-side terminal portion 42A is electrically connected to the circuit-side terminal portion 62 of the flexible print substrate 28 through the conductive ball 61.

As illustrated in FIGS. 8D and 9D, the deformed conductive ball 61 is cracked. Therefore, the circle-equivalent diameter x' which is an apparent diameter in the A direction (see FIG. 8A, FIG. 8C, FIG. 9A, and FIG. 9C) is greater than the diameter (in other words, the average diameter x) before deformation. That is, x'>x is satisfied. The conductive ball 61 to which no pressure is applied is not deformed. Therefore, the conductive ball 61 is maintained in the original shape. That is, the resin of the anisotropic conductive film 60 includes the conductive ball 61 which is deformed in the vicinity of the opening of the first terminal groove 54a and the conductive ball 61 which is separated from the opening of the first terminal groove 54a and is not deformed.

It is preferable that the average area of the deformed conductive ball 61 is equal to or greater than 1.2 times the average area of the conductive ball 61 which are not deformed. In this case, the conductive ball 61 is likely to come into contact with the first conductive material 48a. Here, the average area of the deformed conductive ball 61 is calculated as follows. The areas of the deformed conductive ball 61 are calculated from a circle-equivalent diameter in a plan view and the average of the areas is calculated as the average area of the deformed conductive ball 61, as illustrated in FIGS. 8D and 9D. The number of samples is ten.

The average area of the conductive ball 61 which are not deformed is calculated from the average diameter x. Alternatively, similarly to the above, the areas of the conductive ball 61 which are not deformed may be calculated from the diameters of the conductive ball 61 in a plan view and the average value of the areas may be calculated as the average area. In this case, the number of samples is ten.

Figure 10A:
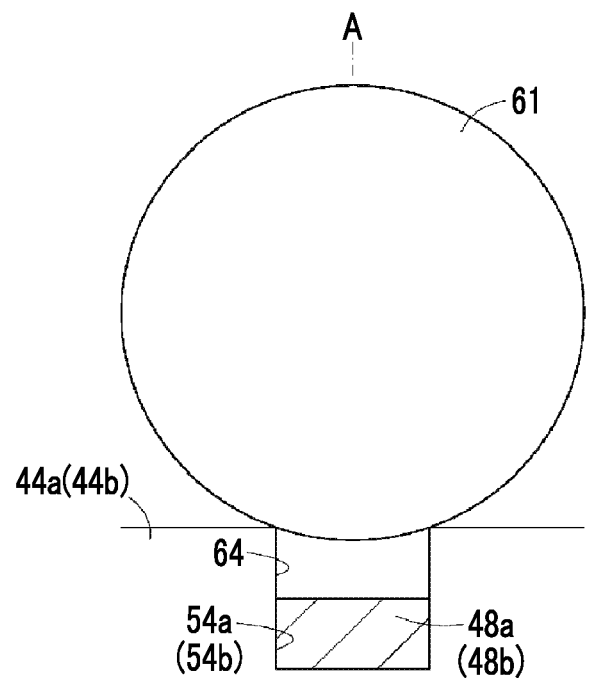
FIG. 10A is a longitudinal sectional view illustrating a state in which a conductive ball with a larger diameter than that in FIG. 9A is caught in the opening of the groove for a terminal and FIG. 10B is a longitudinal sectional view illustrating a state in which the conductive ball is deformed and is caught in the opening of the groove for a terminal.
Figure 10B:
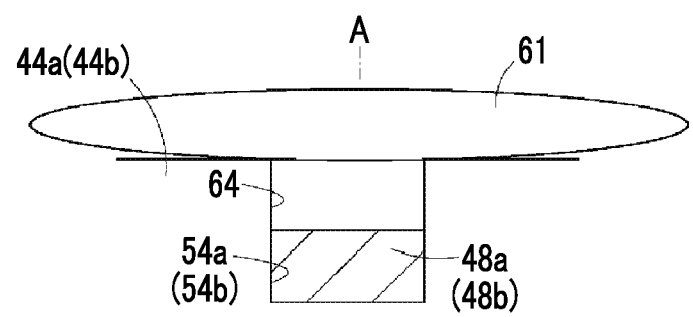

When the anisotropic conductive film 60 including the conductive ball 61 satisfying x/a>7 is used, it is difficult for the conductive ball 61 to enter the first terminal groove 54a and to press the opening of the first terminal groove 54a even if the conductive ball 61 caught in the opening of the first terminal groove 54a is deformed, as illustrated in FIG. 10A which is a longitudinal sectional view before deformation (thermal pressing) and FIG. 10B which is a longitudinal sectional view after deformation (thermal pressing). Therefore, it is difficult to widen the opening of the first terminal groove 54a.

As a result, it is difficult for the conductive ball 61 disposed in the vicinity of the opening of the first terminal groove 54a to physically come into contact with the first conductive material 48a in the first terminal groove 54a. That is, in this case, a conductive path is less likely to be formed between the first conductive material 48a in the first terminal groove 54a and the circuit-side terminal portion 62 of the flexible print substrate 28 by the conductive ball 61.

As described above, the distance from the upper surface of the first conductive material 48a to the opening of the first terminal groove 54a, that is, the depth c of the space 64 is calculated and a film including the conductive ball 61 with the average diameter x that has a predetermined relationship with the dimensions a of the opening of the first terminal groove 54a in the width direction and the depth c of the space 64 is selected as the anisotropic conductive film 60. The first electrode-side terminal portion 42A of the first conductive film 32A can be electrically connected to the circuit-side terminal portion 62 of the flexible print substrate 28 through the conductive ball 61 included in the anisotropic conductive film 60. Therefore, it is possible to manufacture the touch panel 10 with high yield.

The second conductive film 32B includes a second substrate 34B, a plurality of lower detection electrodes 36B, a plurality of second peripheral wires 40B that are electrically connected to the lower detection electrodes 36B through second wire connection portions 38B, and a plurality of second electrode-side terminal portions 42B that are electrically connected to the second peripheral wires 40B.

The second substrate 34B has the same structure as the first substrate 34A. The plurality of lower detection electrodes 36B are provided in parallel so as to be separated from each other in the X direction while extending in the Y direction. The lower detection electrode 36B includes a second resin layer 44b that is provided on the second substrate 34B and has a second electrode groove (a groove for a detection electrode) 46b and a second conductive material 48b that fills the second electrode groove 46b (see FIG. 3A).

The second resin layer 44b, the second electrode groove 46b, and the second conductive material 48b have the same structures as the first resin layer 44a, the first electrode groove 46a, and the first conductive material 48a, respectively. The second resin layer 44b may be stacked on the entire one surface of the second substrate 34B or the second resin layer 44b may be stacked on a portion of the second substrate 34B.

In the second conductive film 32B, the second peripheral wire 40B which is a peripheral wire is electrically connected to one end of each lower detection electrode 36B through the second wire connection portion 38B. As such, when the second wire connection portion 38B is provided, a current smoothly flows from the second peripheral wire 40B to the lower detection electrode 36B and the sensitivity of the touch panel 10 is improved. In addition, the second wire connection portion 38B may not be provided and the lower detection electrode 36B and the second peripheral wire 40B may be directly electrically connected to each other.

The structure in which the second wire connection portion 38B is provided will be described. The second wire connection portion 38B includes the second resin layer 44b having a second wire connection groove 50b and the second conductive material 48b that fills the second wire connection groove 50b (see FIG. 3A). Similarly to the structure of the first conductive film 32A, the second wire connection groove 50b is connected to the second electrode groove 46b, is formed in a rectangular shape in a plan view, and extends in the Y direction.

The second peripheral wire 40B extends from the second wire connection portion 38B to a substantially central portion of the second conductive film 32B in the X direction and is electrically connected to the second electrode-side terminal portion 42B.

The second peripheral wires 40B have the same structure as the first peripheral wires 40A and electrically connect the plurality of lower detection electrodes 36B to the second electrode-side terminal portions 42B and each include the second resin layer 44b having a second wiring groove (a groove for a peripheral wire) 52b and the second conductive material 48b that fills the second wiring groove 52b.

A plurality of second electrode-side terminal portions 42B are provided at one end of the second substrate 34B in the Y direction in a state in which they are separated from each other in the X direction (in a state in which they are electrically insulated from each other). The gap between the second electrode-side terminal portions 42B which are adjacent to each other in the X direction is preferably in the range of 10 µm to 500 µm and more preferably in the range of 15 µm to 300 µm, in terms of electrical insulation and a reduction in size.

All of the second electrode-side terminal portions 42B are located between the first electrode-side terminal portions 42A which are collectively provided on the right side and the first electrode-side terminal portions 42A which are collectively provided on the left side in a plan view.

The second electrode-side terminal portion 42B has the same structure as the first electrode-side terminal portion 42A and includes the second resin layer 44b having a second terminal groove (a groove for a terminal) 54b and the second conductive material 48b that fills the second terminal groove 54b.

In the second conductive film 32B, the second electrode grooves 46b, the second wire connection grooves 50b, the second wiring grooves 52b, and the second terminal grooves 54b which correspond to each other are connected to form a plurality of series of second grooves 56b and the second grooves 56b are filled with the second conductive material 48b to form the plurality of lower detection electrodes 36B, the plurality of second wire connection portions 38B, the plurality of second peripheral wires 40B, and the plurality of second electrode-side terminal portions 42B.

The second electrode-side terminal portion 42B is electrically connected to the circuit-side terminal portion 62 of the flexible print substrate 28 through the anisotropic conductive film 60. Since this structure is the same as that described using the first electrode-side terminal portion 42A and the circuit-side terminal portion 62, the detailed description thereof will not be repeated.

Next, a method for manufacturing the touch panel 10 having the above-mentioned structure will be described. In the following description, a case in which the anisotropic conductive film 60 is thermally pressed against the first conductive film 32A is mainly given as an example. The anisotropic conductive film 60 can be thermally pressed against the second conductive film 32B by the same operation.

Figure 11A:
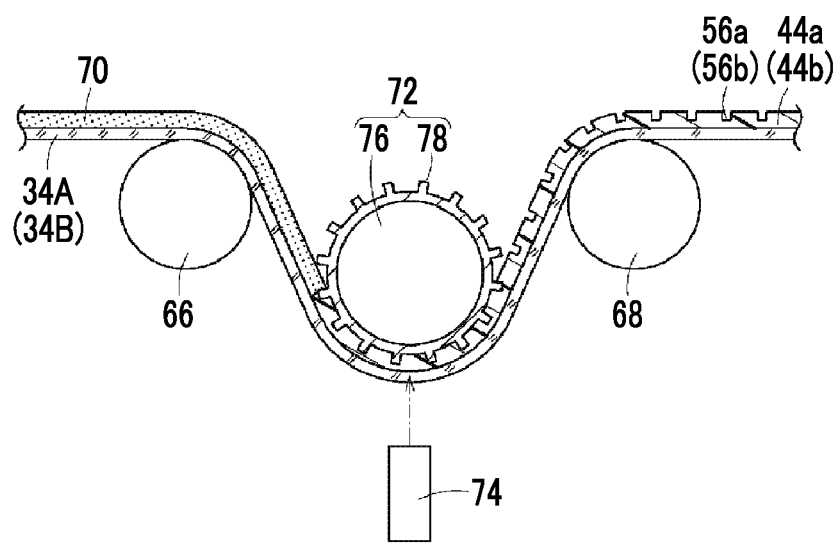
FIG. 11A is a cross-sectional view illustrating a groove forming process.

First, an ultraviolet-curable resin 70 is applied onto one surface of the first substrate 34A that is transported by a plurality of rollers 66 and 68. Then, as illustrated in FIG. 11A, an imprint mold 72 having convex projections is pressed against (transferred to) the ultraviolet-curable resin 70 applied onto one surface of the first substrate 34A and an ultraviolet irradiation device 74 irradiates the ultraviolet-curable resin 70 with ultraviolet rays to obtain the first resin layer 44a having the first grooves 56a formed therein. Preferred examples of the ultraviolet-curable resin 70 include an ultraviolet-curable acrylic resin and an ultraviolet-curable urethane resin.

Figure 11B:
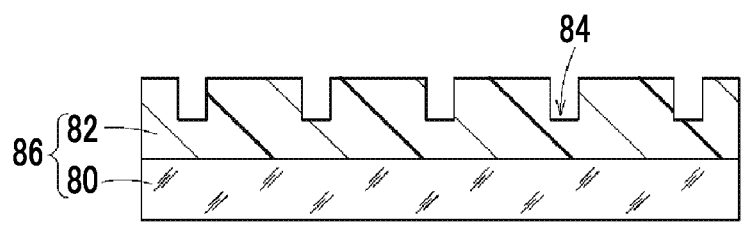
FIG. 11B is a cross-sectional view illustrating a master mold of a film mold used in the process.
Figure 11C:
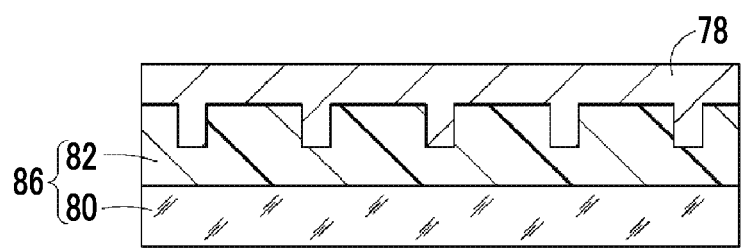
FIG. 11C is a cross-sectional view illustrating a state in which the film mold is manufactured by the master mold.

Here, the imprint mold 72 includes a roller portion 76 and a film mold 78 that is bonded to an outer circumferential surface of the roller portion 76 through an adhesive layer. The film mold 78 can be formed as illustrated in FIG. 11C. First, a photosensitive material 82 applied onto a glass substrate 80 is exposed to light and a predetermined groove pattern 84 is formed on the photosensitive material 82 to obtain a master mold 86 (see FIG. 11B). A material with a sufficiently small surface roughness is selected as the photosensitive material 82. Then, the film mold 78 having projections corresponding to the groove pattern is obtained by the electrolytic deposition of nickel on the groove pattern of the master mold 86 (see FIG. 11C).

It is preferable that a surface treatment is performed on the film mold 78 in order to smoothly separate the first resin layer 44a from the film mold 78. A method for coating a thin film with a silicon dioxide using a sputtering method (coated with a thickness of 1200 Å to 1500 Å) is given as an example of the surface treatment.

In this process, preferably, the first grooves 56a, that is, a plurality of first electrode grooves 46a, a plurality of first wire connection grooves 50a, a plurality of first wiring grooves 52a, and a plurality of first terminal grooves 54a, of which the dimensions in the width direction are a, are simultaneously formed in the first resin layer 44a by one imprint mold 72. In particular, it is preferable that the first electrode grooves 46a and the first terminal grooves 54a are provided in a mesh shape in which a plurality of grooves are connected to each other. However, the first grooves 56a may be formed by a plurality of imprint molds 72.

Instead of the above-mentioned operation, the first resin layer 44a having the first grooves 56a formed therein may be obtained by an operation of applying a thermosetting resin onto one surface of the first substrate 34A, pressing the imprint mold 72 against the thermosetting resin, and heating the thermosetting resin.

Then, the first grooves 56a formed in the first resin layer 44a are filled with conductive ink (ink or paste including the first conductive material 48a) 88 as the first conductive material 48a. A preferred example of the conductive ink 88 is metal nano-ink. The metal nano-ink is ink obtained by dispersing metal nano-particles in water or a solvent and is characterized in that it can be sintered at a low temperature. In particular, silver nano-ink is preferable in terms of a resistance value and temporal stability.

Figure 12A:
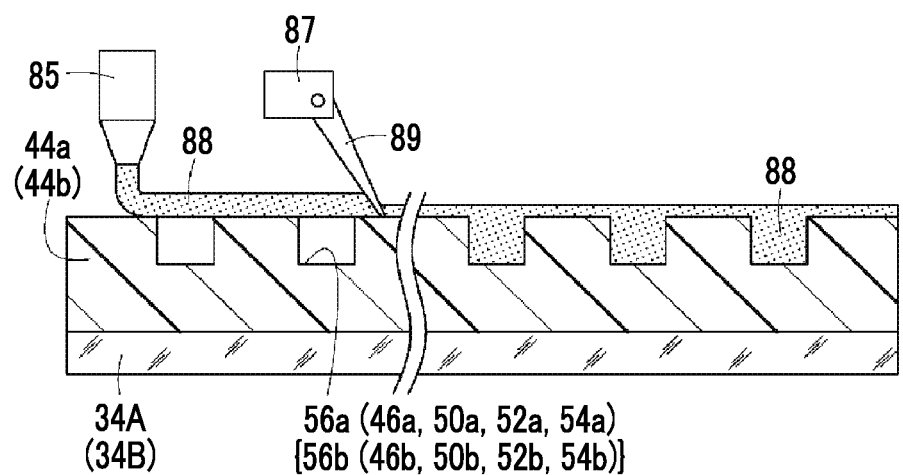
FIG. 12A is a first cross-sectional view illustrating a process of filling a groove with conductive ink and FIG. 12B is a second cross-sectional view illustrating the process.

For example, as illustrated in FIG. 12A, the conductive ink 88 is applied onto the outer surface of the first resin layer 44a by an ink supply unit 85 while the first substrate 34A is transported by roll-to-roll processing. Then, a sweeping unit 87 comes into contact with the outer surface of the first resin layer 44a to introduce (fill) the conductive ink 88 on the outer surface of the first resin layer 44a into the first electrode groove 46a, the first wire connection groove 50a, the first wiring groove 52a, and the first terminal groove 54a.

The amount of conductive ink 88 supplied and the supply speed of the conductive ink 88 are set according to, for example, the viscosity of the conductive ink 88, the width and depth of the first electrode groove 46a, the first wire connection groove 50a, the first wiring groove 52a, and the first terminal groove 54a, and the transport speed of the first substrate 34A. The sweeping unit 87 includes a blade 89 which has a width that is equal to or greater than the width of the first resin layer 44a and extends so as to be inclined in a direction opposite to the transport direction of the first substrate 34A. That is, the contact angle (the angle formed between the first resin layer 44a and the blade 89) of the blade 89 with the first resin layer 44a is an acute angle. Therefore, the blade 89 can be pressed against the first resin layer 44a with appropriate pressure. As a result, it is possible to effectively introduce the conductive ink 88 on the outer surface of the first resin layer 44a into the first electrode groove 46a, the first wire connection groove 50a, the first wiring groove 52a, and the first terminal groove 54a.

In the process of filling the conductive ink 88, the first groove 56a may be filled with different types of conductive ink 88 to form a first conductive material 48a in which a plurality of types of materials are stacked.

The contact angle and pressure of the blade 89 are set such that the conductive ink 88 can be effectively introduced into (fill) the first groove 56a. Therefore, as illustrated in FIG. 12A, the conductive ink 88 remains on the first resin layer 44a, in addition to in the first groove 56a.

Figure 12B:
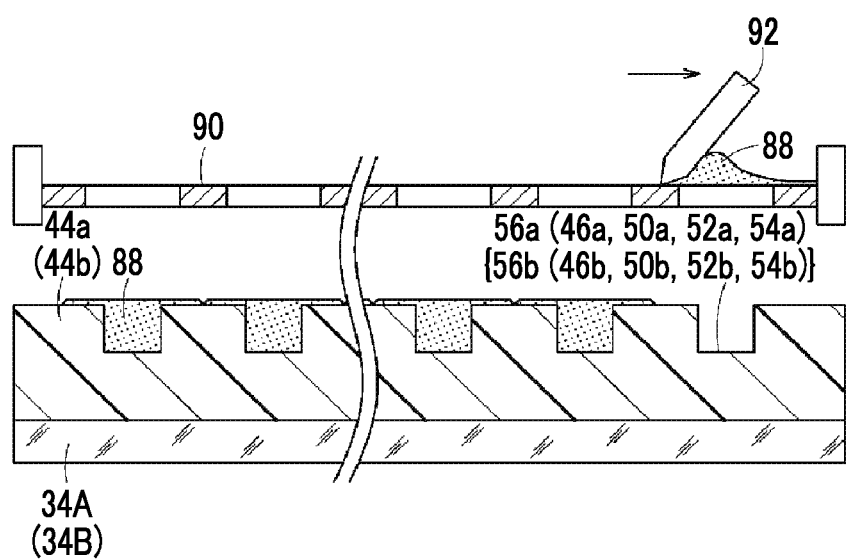

The process of filling the conductive ink 88 may be performed by sheet-to-sheet processing, instead of the roll-to-roll processing. In addition, as illustrated in FIG. 12B, the first groove 56a may be filled with the conductive ink 88 by screen printing. In the screen printing, the conductive ink 88 applied onto a screen 90 is pressed by a squeegee 92 to fill the first terminal groove 54a in the first resin layer 44a. The first terminal groove 54a may be filled with the conductive ink 88 by ink jetting.

In a case in which the screen printing or the ink jetting is used, it is possible to effectively adjust the amount of conductive ink 88 applied to (filling) the first groove 56a. Even in a case in which the screen printing or the ink jetting is used, the conductive ink 88 remains on a portion of the first resin layer 44a other than the first groove 56a, as illustrated in FIG. 12B.

Figure 13A:
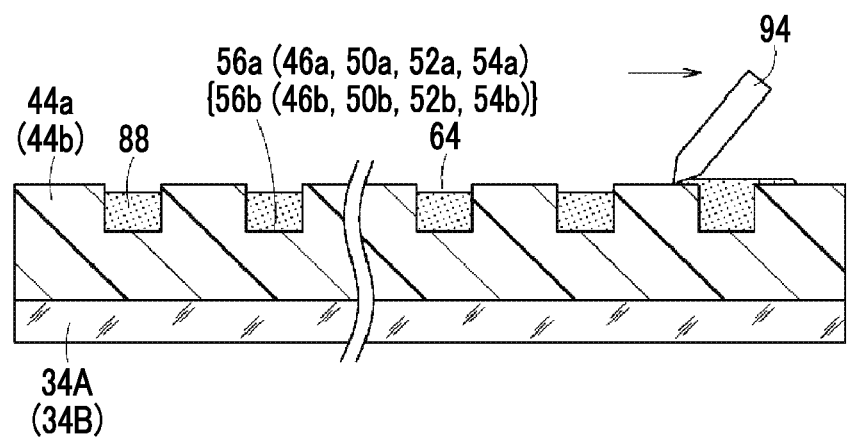
FIG. 13A is a cross-sectional view illustrating a process of removing surplus conductive ink and FIG. 13B is a cross-sectional view illustrating a process of heating the conductive ink.

Then, as illustrated in FIG. 13A, the conductive ink 88 remaining on the outer surface of the first resin layer 44a is removed by a blade 94. Specifically, the blade 94 is slid while coming into contact with the outer surface of the first resin layer 44a. The blade 94 may include a cleaning liquid that softens the remaining conductive ink 88. An example of the cleaning liquid is a mixture of isopropyl alcohol and acetone. In this case, when the mixture ratio of isopropyl alcohol to acetone is 9:1 or 8:2, it is possible to effectively soften the conductive ink 88.

Instead of the above-mentioned operation, one or a plurality of rollers may be pressed against the outer surface of the first resin layer 44a while the first substrate 34A is being transported by roll-to-roll processing, thereby removing the conductive ink 88 remaining on the outer surface of the first resin layer 44a. In this case, the roller may include the above-mentioned cleaning liquid.

In this case, a portion of the conductive ink 88 filling the first groove 56a is removed by the blade 94. Therefore, the upper surface of the first conductive material 48a filling the first groove 56a is closer to the bottom of the groove than the opening of the first groove 56a (the outer surface of the first resin layer 44a). In other words, the space 64 is formed from the opening of the first groove 56a to the upper surface of the conductive ink 88.

Figure 13B:
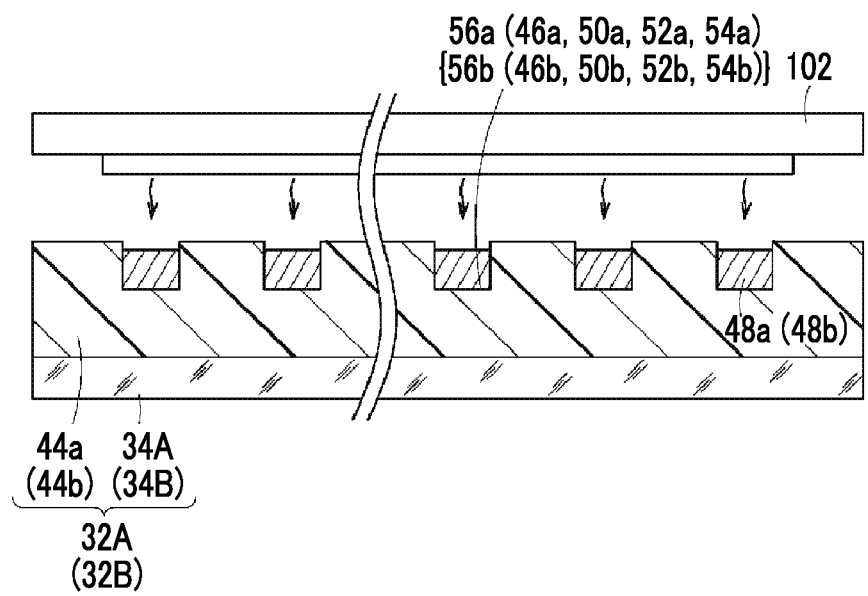

Then, as illustrated in FIG. 13B, the conductive ink 88 filling the first groove 56a is heated by a heating device 102. The heating device 102 irradiates the conductive ink 88 with heat, hot wind, infrared rays, or far infrared rays. Heating conditions are set according to, for example, the material forming the conductive ink 88. The conductive ink 88 is sintered (hardened) into the first conductive material 48a by the heating.

In this way, the first conductive film 32A in which the first groove 56a is filled with the first conductive material 48a is obtained. In addition, the second conductive film 32B is manufactured by the above-mentioned method.

Then, the difference between the depth b of the first terminal groove 54a and the filling height h of the first conductive material 48a (or between the depth b of the second terminal groove 54b and the filling height h of the second conductive material 48b), that is, the depth c of the space 64 is calculated. In order to calculate the depth c, the cross section of the first conductive film 32A in which the first groove 56a is filled with the first conductive material 48a is observed by a scanning electron microscope (SEM) and the depth c of the space 64 is measured. The measured value may be the depth c of the space 64 in the first conductive film 32A.

Specifically, the first conductive film 32A is cut by, for example, a focused ion beam (FIB) device in a plane perpendicular to the direction in which the first terminal groove 54a extends. Then, the SEM is set such that the cut plane of the first terminal groove 54a is included in the field of view and the distance from the opening of the first terminal groove 54a to the upper surface of the first conductive material 48a filling the first terminal groove 54a is measured from an image of the cut plane. In the invention, the same measurement process as described above is performed for ten first terminal grooves 54a and the average value of the measured values is used as the depth c.

The dimensions (width) a of the first terminal groove 54a in the width direction is also calculated using the SEM image used to calculate the depth c. That is, the distance from one side wall to the other side wall of the first terminal groove 54a may be measured in the direction perpendicular to the depth c and the dimensions of the first terminal groove 54a in the width direction may be calculated from the measured value and a magnification at that time. In the invention, the same measurement process as described above is performed for ten first terminal grooves 54a and the average value of the measured values is used as the dimensions in the width direction.

Then, the first conductive film 32A and the second conductive film 32B are bonded to each other through, for example, an OCA sheet to form the sensor body 26. In addition, the anisotropic conductive film 60 including the conductive ball 61 and the flexible print substrate 28 are stacked on the first electrode-side terminal portions 42A of the first conductive film 32A and the second electrode-side terminal portions 42B of the second conductive film 32B and are pressed while being heated. That is, thermal pressing is performed to bond the anisotropic conductive film 60 and the flexible print substrate 28 to the sensor body 26.

Here, a film including the conductive ball 61, of which the average diameter x has a predetermined relationship with the dimensions a of the first terminal groove 54a in the width direction and the depth c of the space 64, is selected as the anisotropic conductive film 60. That is, when $x \leq a$ is satisfied, $x > c$ is satisfied. When $x > a$ is satisfied, $1 < x/a \leq 7$ is satisfied.

In the invention, it is preferable to select a conductive ball satisfying one of the two conditions. In a case in which two types of conductive balls are used, it is preferable that two types of balls satisfy one of the conditions. In addition, the proportion of conductive balls satisfying one of the two conditions to the conductive ball used is preferably equal to or greater than 5%, more preferably equal to or greater than 30%, and most preferably equal to or greater than 50%.

Since the anisotropic conductive film 60 including the conductive ball 61 satisfying these conditions is used, the first conductive material 48a (first electrode-side terminal portion 42A) in the first terminal groove 54a and the circuit-side terminal portion 62 of the flexible print substrate 28 which is bonded to the upper surface of the anisotropic conductive film 60 come into contact with each other through the conductive ball 61. In this way, a conductive path is formed between the first conductive material 48a and the circuit-side terminal portion 62.

Thermal pressing conditions (for example, pressing conditions) are set such that the average area of the conductive ball 61 caught in the openings of the first terminal grooves 54a after deformation in a plan view is equal to or greater than 1.2 times the average area of the conductive ball 61 which are not deformed. In this case, a sufficient conductive path is formed.

The above-mentioned structure holds for the second terminal groove 54b.

In this way, a conductive path is ensured between the first electrode-side terminal portion 42A or the second electrode-side terminal portion 42B and the circuit-side terminal portion 62. Therefore, it is possible to obtain the touch panel 10 with high yield.

In addition, the first electrode grooves 46a, the first wire connection grooves 50a, the first wiring grooves 52a, and the first terminal grooves 54a are connected to form the first grooves 56a at the same time and the first grooves 56a are filled with the conductive ink 88 as the first conductive material 48a. Therefore, it is possible to effectively form the upper detection electrodes 36A, the first wire connection portions 38A, the first peripheral wires 40A, and the first electrode-side terminal portions 42A.

In the method for manufacturing the touch panel 10, the first electrode-side terminal portion 42A is formed at the same time as the upper detection electrode 36A, the first wire connection portion 38A, and the first peripheral wire 40A. That is, the grooves are formed at the same time and the grooves are filled with the conductive ink 88 at the same time.

However, the method for manufacturing the touch panel 10 is not particularly limited. For example, after the upper detection electrode 36A, the first wire connection portion 38A, and the first peripheral wire 40A are formed, the first electrode-side terminal portion 42A may be formed.

As the dimensions a of the first terminal groove 54a in the width direction increases, the depth c of the space 64 in the first terminal groove 54a increases. Therefore, the conductive ball 61 which is located in the vicinity of the opening of the first terminal groove 54a is likely to move to the bottom of the groove. In this case, the contact area between the conductive ball 61 is likely to decrease and the contact resistance therebetween is likely to increase. In contrast, as the dimensions a of the first terminal groove 54a in the width direction decrease, the contact resistance between the conductive ball 61 and the first conductive material 48a filling the first terminal groove 54a increases.

Figure 14:
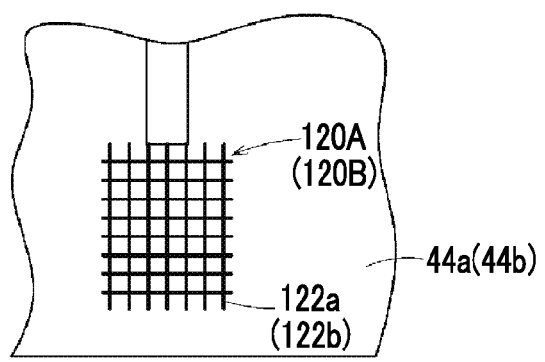
FIG. 14 is a plan view schematically illustrating an electrode-side terminal portion which is formed in a mesh pattern.

A first electrode-side terminal portion 120A having a mesh pattern obtained by arranging a plurality of first terminal grooves 122a in a mesh shape may be provided in the first conductive film 32A, as illustrated in FIG. 14. The mesh pattern may be a combination of a plurality of cells with the same shape or a combination of a plurality of cells with different shapes. Similarly, a second electrode-side terminal portion 120B having a mesh pattern obtained by arranging a plurality of second terminal grooves 122b in a mesh shape may be provided, which is not illustrated in the drawings.

In this case, the width of the first terminal groove 122a is preferably in the range of 1 μm to 30 μm and more preferably in the range of 1.5 μm to 15 μm. The pitch between the first terminal grooves 122a which are parallel and adjacent to each other is preferably in the range of 5 μm to 100 μm and more preferably in the range of 10 μm to 50 μm. The shape of the cell of the mesh pattern may be a polygon, such as a triangle, a rectangle, a pentagon, or a hexagon. Among them, it is preferable that the shape of the cell is a rhomboid, a square, and a regular hexagon. The mesh pattern may be a combination of a plurality of cells with different shapes.

According to this structure, since the first electrode-side terminal portion 120A includes a plurality of first terminal grooves 122a, the contact area between the first conductive material 48a in the first terminal groove 122a and the conductive ball 61 and the contact area between a portion of the conductive ball 61 which is exposed from the first terminal groove 122a and the circuit-side terminal portion 62 are sufficiently ensured. Therefore, it is possible to reduce both the contact resistance between the first conductive material 48a of the first electrode-side terminal portion 120A and the conductive ball 61 and the contact resistance between the conductive ball 61 and the circuit-side terminal portion 62.

The touch panel and the method for manufacturing the touch panel according to the invention are not limited to the above-described embodiment and may have various structures without departing from the scope and spirit of the invention.

For example, in the first conductive film 32A, a dummy pattern which is insulated from the upper detection electrodes 36A may be provided between the upper detection electrodes 36A which are adjacent to each other. In this case, the upper detection electrodes 36A are less likely to be seen (visibility is improved). It is preferable that the line width and pitch of the dummy pattern are the same as those of the upper detection electrode 36A.

For the same reason as described above, in the second conductive film 32B, a dummy pattern which is insulated from the lower detection electrodes 36B may be provided between the lower detection electrodes 36B which are adjacent to each other.

The dummy pattern may be formed at the same time as the upper detection electrodes 36A (or the lower detection electrodes 36B) or may be formed in another process.

The detection electrode or the dummy pattern may be formed by, for example, a method that vapor-deposits metal on the first substrate 34A, forms a patterned resist on the metal, and etches the metal with an etchant to form a fine metal wire pattern. Alternatively, the detection electrode or the dummy pattern may be formed by a method that applies metal ink onto the first substrate 34A using screen printing to form a fine metal wire pattern.

EXAMPLE

Example 1

An anisotropic conductive film including conductive balls was pressed and bonded to terminal portions of a sensor body, in which 20 terminal grooves were formed at a pitch of 5 μm and the dimensions a of the groove in the width direction (the width of the groove) and the depth c of the space were as illustrated in Table 1, at room temperature. In addition, after a flexible print substrate was stacked on the anisotropic conductive film, the laminate was placed on a receiving table and thermal pressing which pressed a heating tool that was heated from the upper side was performed at 150° C.

The average diameter x of the conductive balls is also illustrated in Table 1. When the width a of the terminal groove and the depth c of the space were calculated, first, the conductive film was cut by an FIB device in the plane perpendicular to the direction in which the terminal groove extended and 10 SEM images including the cut plane of the terminal groove were captured. Then, in each SEM image, the distance from the opening of the terminal groove to the upper surface of the conductive material filling the terminal groove and the dimensions of the terminal groove in the width direction were measured and the average value of the distances and the average value of the dimensions were calculated. Table 1 shows the average value of the widths a of the grooves and the average value of the depths c of the spaces. For the diameter of the conductive ball, the conductive ball which were not deformed in the ACF were acquired and the diameters of the conductive ball were measured by an optical microscope. The average value of the diameters was used as the diameter of the conductive ball.

TABLE 1

| Width a of groove (μm) | Depth c of space (μm) | Average diameter x of conductive balls (μm) | Number of terminal grooves electrically connected | Determination |
|---|---|---|---|---|
| 3 | 0.3 | 0.3 | 15 | C |
|   | 0.7 | 0.5 | 2 | D |
|   | 0.7 | 1 | 19 | B |
|   | 0.7 | 2.5 | 20 | A |
| 7 | 1.8 | 1 | 1 | D |
|   | 1.8 | 2.5 | 18 | B |
|   | 1.8 | 4 | 20 | A |

In the touch panel obtained in this way, it was examined by a tester whether the conductive material in the terminal groove was electrically connected to the terminal portion of the flexible print substrate. The number of terminal grooves in which electrical connection occurs is illustrated in Table 1 in association with the average diameter x of the conductive ball. In Table 1, the "number of terminal grooves electrically connected" indicates the number of terminal grooves in which electrical connection occurs. In addition, a case in which electrical connection is ensured in all of the terminal grooves is represented by "A", a case in which electrical connection is ensured in 90% or more of the terminal grooves is represented by "B", a case in which electrical connection is ensured in 70% to 90% of the terminal grooves is represented by "C", and a case in which electrical connection is ensured in less than 70% of the terminal grooves is represented by "D". For practical use, the evaluation result "A" or "B" is required.

As illustrated in Table 1, in any of the cases, the average diameter x of the conductive ball is equal to or less than the width a of the groove. When the average diameter x is greater than the depth c of the space, electrical connection occurs in 90% or more of the terminal grooves. In particular, when the average diameter x is equal to or greater than two times the depth c of the space, electrical connection occurs in 100%, that is, all of the terminal grooves.

This result shows that, when the anisotropic conductive film including the conductive ball, of which the average diameter x is equal to or less than the width a of the groove and is greater than the depth c of the space, is selected, a sufficient conductive path is formed between the terminal portion, furthermore, the detection electrode of the sensor body and the terminal portion of the flexible print substrate.

Example 2

An anisotropic conductive film including conductive balls, of which the average diameter x was greater than the width a of a terminal groove, was pressed and bonded to terminal portions of a sensor body, in which 20 terminal grooves, of which the dimensions (width) a in the width direction were 3 μm, were formed at a pitch of 5 μm and the depth c of the space was 0.7 μm, at room temperature. In addition, after a flexible print substrate was stacked on the anisotropic conductive film, the laminate was placed on a receiving table and thermal pressing which pressed a heating tool that was heated from the upper side was performed at 150° C. The average diameter x of the conductive ball and the ratio x/a of the average diameter x to the width a of the groove are illustrated in Table 2.

TABLE 2

| Width a of groove (μm) | Depth c of space (μm) | Average diameter x of conductive balls (μm) | Ratio (x/a) | Number of terminal grooves electrically connected | Determination |
|---|---|---|---|---|---|
| 3 | 0.7 | 4 | 1.3 | 20 | A |
|  |  | 10 | 3.3 | 20 | A |
|  |  | 20 | 6.6 | 19 | B |
|  |  | 25 | 8.3 | 15 | C |
|  |  | 30 | 10 | 2 | D |

In the touch panel obtained in this way, it was examined by a tester whether a conductive material in the terminal groove was electrically connected to the terminal portion of the flexible print substrate. The number of terminal grooves in which electrical connection occurs is illustrated in Table 2 in association with the average diameter x of the conductive ball. Similarly to the above, in Table 2, the "number of terminal grooves electrically connected" indicates the number of terminal grooves in which electrical connection occurs. In addition, a case in which electrical connection is ensured in all of the terminal grooves is represented by "A", a case in which electrical connection is ensured in 90% or more of the terminal grooves is represented by "B", a case in which electrical connection is ensured in 70% to 90% of the terminal grooves is represented by "C", and a case in which electrical connection is ensured in less than 70% of the terminal grooves is represented by "D". For practical use, the evaluation result "A" or "B" is required. This result is illustrated in FIG. 15 which is a graph having the horizontal axis indicating x/a and the vertical axis indicating the number of terminal grooves in which electrical connection occurs (the number of terminal grooves electrically connected).

Figure 15:
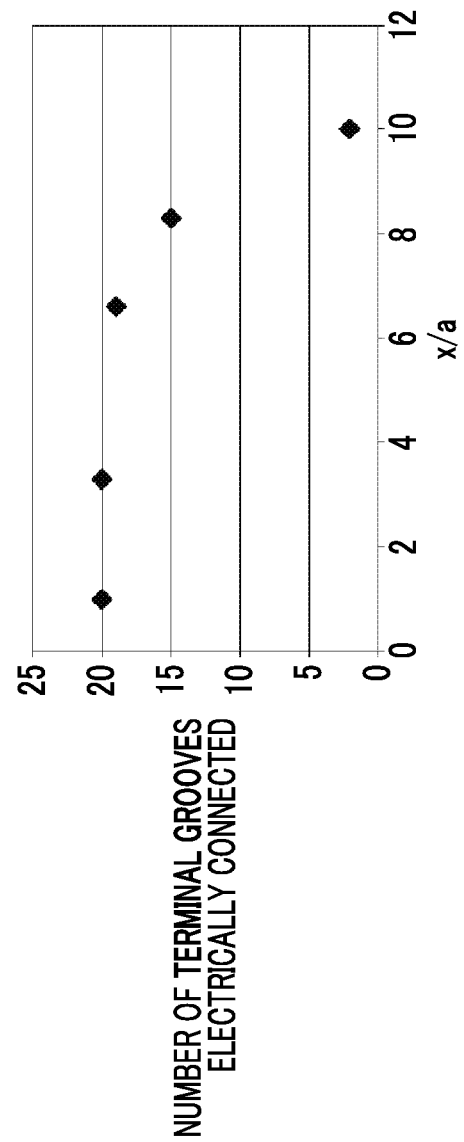
FIG. 15 is a graph in which the horizontal axis indicates $x/a$ and the vertical axis indicates the number of terminal grooves in which electrical connection occurs (the number of terminal grooves electrically connected).

As can be seen from Table 2 and FIG. 15, when x/a is greater than 1 and equal to or less than 7, electrical connection occurs in 90% or more of the terminal grooves. In particular, when x/a is greater than 1 and equal to or less than 6, electrical connection occurs in 100%, that is, all of the terminal grooves.

Therefore, when the anisotropic conductive film including the conductive ball, of which the average diameter x is equal to or less than the width a of the groove and in which x/a is greater than 1 and equal to or less than 7, is selected, a sufficient conductive path is formed between the terminal portion, furthermore, the detection electrode of the sensor body and the terminal portion of the flexible print substrate.

In addition, 10 conductive balls which were deformed in the vicinity of the terminal grooves were randomly sampled and the average value of the circle-equivalent diameters of the conductive balls in a plan view was calculated by a microscope. In addition, an average area A2 was calculated from the average value. The ratio A2/A1 of the average area A2 to the average area A1 calculated from the average diameter x of the conductive balls (that is, the average area of the conductive balls which were not deformed) was calculated. In the touch panel in which the evaluation result of the number of terminal grooves electrically connected was "A" or "B", the ratio A2/A1 was equal to or greater than 1.2. This shows that, when the average area of the conductive balls deformed in the vicinity of the openings of the terminal grooves is equal to or greater than 1.2 times the average area of the conductive balls which are not deformed, it is possible to increase the number of terminal grooves electrically connected.

EXPLANATION OF REFERENCES

10: touch panel
12: display device
26: sensor body
28: flexible print substrate
32A: first conductive film
32B: second conductive film
34A: first substrate
34B: second substrate
36A: upper detection electrode
36B: lower detection electrode
38A: first wire connection portion
38B: second wire connection portion
40A: first peripheral wire
40B: second peripheral wire
42A, 120A: first electrode-side terminal portion
42B, 120B: second electrode-side terminal portion
44$a$: first resin layer
44$b$: second resin layer
46$a$: first electrode groove
46$b$: second electrode groove
48$a$: first conductive material
48$b$: second conductive material
50$a$: first wire connection groove
50$b$: second wire connection groove
52$a$: first wiring groove
52$b$: second wiring groove
54$a$, 122$a$: first terminal groove
54$b$, 122$b$: second terminal groove
56$a$: first groove
56$b$: second groove
60: anisotropic conductive film
61: conductive ball
62: circuit-side terminal portion

What is claimed is:
1. A touch panel comprising:
a substrate;
a plurality of detection electrodes that are provided on the substrate;
peripheral wires that are electrically connected to the detection electrodes;
electrode-side terminal portions that are electrically connected to the peripheral wires;
a circuit board on which circuit-side terminal portions electrically connected to the electrode-side terminal portions are provided; and
a resin material that is interposed between the substrate and the circuit board and includes a conductive ball electrically connecting the electrode-side terminal portions and the circuit-side terminal portions,
wherein the electrode-side terminal portion includes a resin layer in which a groove for a terminal portion is formed and a conductive material which fills the groove for a terminal portion,
when an average diameter of the conductive ball is x, and the dimensions of the groove for a terminal portion in a width direction are a,
the resin material includes the conductive ball satisfying x>a and 1<x/a≤6,
in a state of the resin material that includes the conductive ball is thermally pressed, an opening of the groove for the terminal portion is widened and the conductive ball come into contact with the conductive material, the conductive ball which is located in the vicinity of the opening of the groove for a terminal portion is deformed, and an average area of the deformed conductive ball in a plan view is equal to or greater than 1.2 times an average area of the conductive ball, which is not deformed in the resin material, in a plan view.

2. The touch panel according to claim 1,
wherein a plurality of the grooves for a terminal portion are connected to form a mesh shape.

3. The touch panel according to claim 2,
wherein a groove for a peripheral wire which is connected to the groove for a terminal portion and a groove for a detection electrode which is connected to the groove for a peripheral wire are formed in the resin layer, and
the peripheral wire and the detection electrode are made of a conductive material that fills each of the groove for a peripheral wire and the groove for a detection electrode.

4. The touch panel according to claim 1,
wherein a groove for a peripheral wire which is connected to the groove for a terminal portion and a groove for a detection electrode which is connected to the groove for a peripheral wire are formed in the resin layer, and
the peripheral wire and the detection electrode are made of a conductive material that fills each of the groove for a peripheral wire and the groove for a detection electrode.

5. A method for manufacturing a touch panel comprising a substrate, a plurality of detection electrodes that are provided on the substrate, peripheral wires that are electrically connected to the detection electrodes, electrode-side terminal portions that are electrically connected to the peripheral wires, a circuit board on which circuit-side terminal portions electrically connected to the electrode-side terminal portions are provided, and a resin material that is interposed between the substrate and the circuit board and includes a conductive ball electrically connecting the electrode-side terminal portions and the circuit-side terminal portions, the method comprising:

a step of forming a resin layer on at least a portion of one surface of the substrate and transferring a convex portion of a mold to the resin layer to form a groove for a terminal portion;

a step of filling at least a portion of the groove for a terminal portion with a conductive material to form the electrode-side terminal portion;

a step of removing the conductive material which remains on an outer surface of the resin layer; and a step of stacking the circuit board, on which the circuit-side terminal portions electrically connected to the electrode-side terminal portions are provided, on the resin layer through a resin material including a conductive ball, wherein, when an average diameter of the conductive ball is x, and the dimensions of the groove for a terminal portion in a width direction are a, a material which includes the conductive ball satisfying x>a and 1<x/a≤6 is selected as the resin material, the resin material that includes the conductive ball is thermally pressed, an opening of the groove for the terminal portion is widened and the conductive ball is come into contact with the conductive material, and in the resin material, the conductive ball which is located in the vicinity of the opening of the groove for a terminal portion is deformed until an average area in a plan view is equal to or greater than 1.2 times an average area of the conductive ball, which is not deformed in the resin material, in a plan view.

6. The method for manufacturing a touch panel according to claim 5,
wherein a plurality of the grooves for a terminal portion are connected to form a mesh shape.

7. The method for manufacturing a touch panel according to claim 6,
wherein when the groove for a terminal portion is formed in the resin layer, a groove for a peripheral wire which is connected to the groove for a terminal portion and a groove for a detection electrode which is connected to the groove for a peripheral wire are formed, and
the groove for a peripheral wire and the groove for a detection electrode are filled with a conductive material to form the peripheral wire and the detection electrode.

8. The method for manufacturing a touch panel according to claim 5,
wherein when the groove for a terminal portion is formed in the resin layer, a groove for a peripheral wire which is connected to the groove for a terminal portion and a groove for a detection electrode which is connected to the groove for a peripheral wire are formed, and
the groove for a peripheral wire and the groove for a detection electrode are filled with a conductive material to form the peripheral wire and the detection electrode.

* * * * *